3,758,502
ORGANIC COMPOUNDS

Fritz Seemann, 52 Spalenring, 4000 Basel, Switzerland, and Franz Troxler, 39 Drosselstrasse, 4103 Bottmingen, Switzerland
No Drawing. Filed Sept. 22, 1971, Ser. No. 182,911
Claims priority, application Switzerland, Sept. 30, 1970, 14,465/70
Int. Cl. C07d 27/52
U.S. Cl. 260—326.15         2 Claims

ABSTRACT OF THE DISCLOSURE

The invention concerns novel indole derivatives of the formula:

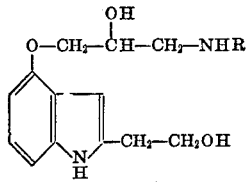

wherein R is alkyl of 1 to 6 carbon atoms, or alkinyl of 3 to 6 carbon atoms, wherein the carbon atom attached to the nitrogen atom is saturated.

A process for the production of the said compounds as well as intermediates therefor are described.

The compounds are useful in the prophylaxis and treatment of coronary diseases, such as angina pectoris, and heart rhythm disorders.

---

This invention relates to novel indole derivatives.

In accordance with the invention there are provided new compounds of Formula I,

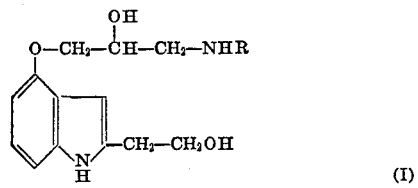

wherein R is alkyl of 1 to 6 carbon atoms, or alkinyl of 3 to 6 carbon atoms, wherein the carbon atom attached to the nitrogen atom is saturated.

The preferred compounds of Formula I are those wherein the radical R is branched, especially in an α position to the nitrogen atom, e.g. isopropyl, sec.butyl, tert.-butyl, tert.pentyl, 3-pentyl or 1,1-dimethylpropin-2-yl.

Further, in accordance with the invention a compound of Formula I may be obtained by a process comprising reducing a compound of Formula II,

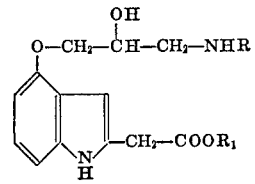

wherein
R is as defined above, and
$R_1$ is alkyl of 1 to 4 carbon atoms, with a complex hydride, and subsequently isolating the compound of Formula I in free base or acid addition salt form.

The process of the invention is suitably carried out in an inert organic solvent. The reduction using a complex hydride may, for example, be effected at room temperature or with heating in an inert organic solvent, e.g. an open-chain or cyclic ether such as dioxane or tetrahydrofuran, or by using sodium borohydride in a lower alcohol such as methanol or ethanol. Examples of suitable complex hydrides are sodium borohydride, sodium dihydrobis-(2-methoxyethoxy)aluminate and lithium aluminium hydride. Reaction times under preferred conditions are about ½ to several hours. The reaction mixture may be worked up in accordance with known methods, e.g. by adding water or a lower alkanol thereto, filtering off the resulting precipitate, separating the organic phase, evaporating to dryness and extracting the residue between water and an organic solvent, e.g. ethyl acetate, ether or chloroform. After concentrating the organic phase by evaporation the compound of Formula I is obtained as residue and may be purified in the usual manner, e.g. by recrystallization.

The compounds of Formula II, required as starting materials, are new. They may, for example, be produced by reacting a compound of Formula III,

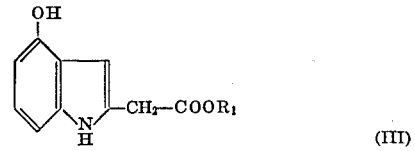

wherein $R_1$ is as defined above, as salt or in the presence of a base, with an epihalohydrin, preferably epichlorhydrin or epibromhydrin, and condensing the resulting reaction product with an amine of Formula IV, $$NH_2—R \qquad (IV)$$

wherein R is as defined above, in an inert organic solvent, e.g. dioxane, benzene or toluene, at a temperature of 20° to 150° C., preferably at the boiling temperature of the reaction mixture.

The compounds of Formula III may, for example, be obtained by hydrogenolytic debenzylation of a compound of Formula V,

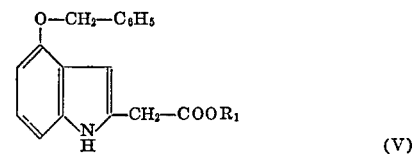

wherein $R_1$ is as defined above.

The compounds of Formula V may, for example, be produced by reacting 4-benzyloxyindole-2-acetic acid chloride with a corresponding alcohol.

4-benzyloxyindole-2-acetic acid as well as its acid chloride have been described in the literature. Both compounds are suitably obtained from 4-benzyloxyindole-2-acetonitrile and further used without separation from the reaction mixture.

Insofar as the production of the starting materials is not particularly described, these are known or may be produced in accordance with known processes or in a manner analogous to the processes described herein or to known processes.

The compounds of Formula I have hitherto not been described in the literature. The compounds are useful because they possess pharmacological activity in animals. More particularly, the compounds are useful in the prophylaxis and treatment of coronary diseases, including the treatment of angina pectoris, the hyperkinetic heart syndrome and conditions resulting from a muscular hypertrophic subvalvular aortostenosis and in the treatment of heart rhythm disorders. This is indicated by, for example, an inhibition of the positive inotropic adrenalin effect in the spontaneously beating, isolated guinea pig atrium, and an inhibition of the tachycardia and hypotension caused by isoproterenol [1 - (3,4-dihydroxyphenyl)-2-isopropylaminoethanol] in the narcotized cat.

For the above-mentioned use, the dosage administered will naturally vary depending on the compound employed, theh mode of administration and the treatment desired. However, in general, satisfactory results are obtained at daily dosages of from 0.004 to 3 mg./kg. animal body weight, conveniently given in divided doses 2 to 3 times a day or in sustained release form. For the larger mammals, the daily dosage is from about 10 to 200 mg., and unit dosage forms suitable for oral administration contain from about 3 to 100 mg. of the compound, in association with a pharmaceutical carrier or diluent.

The compounds of Formula I may be administered in pharmaceutically acceptable acid addition salt form. Such salts possess the same order of activity as the free bases and are readily prepared in conventional manner. Suitable such salt forms include organic acid salts such as the fumarate, maleate, tartrate, methane-, ethane- and benzene-sulphonate, citrate and malate, and mineral acid salts such as the hydrochloride, hydrobromide and sulphate.

The compounds of Formula I or their pharmaceutically acceptable acid addition salts may be used as medicaments on their own or in the form of appropriate medicinal preparations, e.g. tablets, dragées, capsules, granules, suppositories or injectable solutions or suspensions, for enteral or parenteral administration. Aside from the usual inorganic or organic pharmaceutically acceptable adjuvants, e.g. lactose, starch, talc, stearic acid, water, alcohols, natural or hardened oils and waxes, these preparations may also contain suitable preserving, stabilizing or wetting agents, solubilizers, sweetening or colouring substances and flavourings.

The invention accordingly also provides a pharmaceutical composition comprising as active agent a compound of Formula I, in free base or pharmaceutically acceptable acid addition salt form, in association with a pharmaceutical carrier or diluent.

In the following non-limitative example all temperatures are indicated in degrees centigrade and are uncorrected.

Example.—2-hydroxyethyl-4-(2-hydroxy-3-isopropylaminopropoxy)indole 27.2 g. of sodium borohydride are added portionwise to a solution of 15.2 g. of 4-(2-hydroxy-3-isopropylaminopropoxy)indole-2-acetic acid methyl ester in 280 cc. of ethanol, at room temperature, while stirring, over a period of 8 hours, and the mixture is stirred for a further 16 hours. Filtration is effected, the filtrate is evaporated to dryness at reduced pressure and extraction is effected between ethyl acetate and water. The organic phase is dried over magnesium sulphate, is evaporated to dryness at reduced pressure, and the resulting crude title compound is crystallized from ether and subsequently recrystallized from ethyl acetate; prisms having a M.P. of 96–98°.

The (4-(2-hydroxy-3-isopropylaminopropoxy)indole-2-acetic acid methyl ester, required as starting material, may be produced as follows:

17.4 g. of 4-hydroxyindole-2-acetic acid methyl ester, 94.5 g. of epichlorhydrin and 2 drops of piperidine are heated to the boil while stirring for 7 hours and subsequently concentrated by evaporation at reduced pressure. The resulting residue is taken up in 52.3 g. of N-benzylisopropylamine and 100 cc. of dioxane, and the mixture is heated to the boil for 4 hours. The reaction mixture is evaporated to dryness at reduced pressure and the residue is extracted between ethyl acetate and 1 N hydrochloric acid. The hydrochloric acid phases are rendered alkaline with a 10% soda solution at 0–5° while cooling with ice and are subsequently extracted with methylene chloride. The evaporation residue of the methylene chloride phases which have been dried over magnesium sulphate, is crystallized from ethyl acetate. 4-(3-benzylisopropylamino-2-hydroxypropoxy) indole-2-acetic acid methyl ester is obtained as crystals having a M.P. of 135–136°.

10.7 g. of the benzyl compound obtained above are dissolved in 300 cc. of methanol and shaken with hydrogen in the presence of 10 g. of a palladium catalyst (5% on charcoal) until the uptake of hydrogen stops. The catalyst is filtered off, the filtrate is evaporated to dryness at reduced pressure and the evaporation residue is crystallized from ethyl acetate. The title compound has a M.P. of 106–108°.

4-hydroxyindole-2-acetic acid methyl ester (oil) is obtained by debenzylation of 4-benzyloxyindole-2-acetic acid methyl ester (M.P. 89–90°, from benzene) and the latter compound is obtained by alkaline hydrolysis of 4-benzyloxyindole-2-acetonitrile to obtain 4-benzyloxyindole-2-acetic acid, which is directly esterified in ethereal solution with a likewise ethereal solution of diazomethane to obtain 4-benzyloxyindole-2-acetic acid methyl ester.

In analogous manner the following compounds may be obtained:

4-(3-tert.butylamino-2-hydroxypropoxy)-2-hydroxyethylindole, 4-(3-sec.butylamino-2-hydroxypropoxy)-2-hydroxyethylindole, 2-hydroxyethyl-4-(3-methylamino-2-hydroxypropoxy) indole, 2-hydroxyethyl-4-[2-hydroxy-3-(3-pentylaminopropoxy)] indole, 2-hydroxyethyl-4-(2-hydroxy-3-tert.pentylaminopropoxy) indole, 2-hydroxyethyl-4-[2-hydroxy-3-(1,1-dimethyl-2-propinylamino)propoxy]indole.

What is claimed is:
1. A compound of the formula:

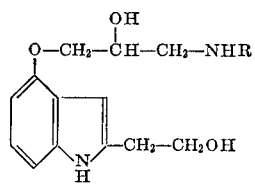

wherein R is alkyl of 1 to 6 carbon atoms, or alkinyl of 3 to 6 carbon atoms, wherein the carbon atom attached to the nitrogen atom is saturated, in free base or pharmaceutically acceptable acid addition salt form.

2. The compound of claim 1, which is 2-hydroxyethyl-3-(2-hydroxy-3-isopropylaminopropoxy)indole.

References Cited
UNITED STATES PATENTS
3,644,353   2/1972   Lunts et al.

JOSEPH A. NARCAVAGE, Primary Examiner

U.S. Cl. X.R.
260—326.13 R, 326.14 R

UNITED STATES PATENT OFFICE
CERTIFICATE OF CORRECTION

Patent No. 3,758,502          Dated September 11, 1973

Inventor(s) Fritz SEEMANN and Franz TROXLER

It is certified that error appears in the above-identified patent and that said Letters Patent are hereby corrected as shown below:

Assignee:
    Sandoz Ltd.
    Basle, Switzerland

Signed and sealed this 1st day of January 1974.

(SEAL)
Attest:

EDWARD M. FLETCHER, JR.      RENE D. TEGTMEYER
Attesting Officer            Acting Commissioner of Patents